US012200305B2

(12) United States Patent
Jeon

(10) Patent No.: US 12,200,305 B2
(45) Date of Patent: Jan. 14, 2025

(54) VR VIDEO MANAGEMENT METHOD AND SYSTEM FOR ENABLING SIMULTANEOUS TRAINING OF MULTIPLE USERS

(71) Applicant: VENTAVR CO., LTD, Seoul (KR)

(72) Inventor: Woo Yeol Jeon, Goyang-si (KR)

(73) Assignee: VENTAVR CO., LTD, Seoul (KR)

( * ) Notice: Subject to any disclaimer, the term of this patent is extended or adjusted under 35 U.S.C. 154(b) by 0 days.

(21) Appl. No.: 18/693,149

(22) PCT Filed: Oct. 7, 2022

(86) PCT No.: PCT/KR2022/015166
§ 371 (c)(1),
(2) Date: Mar. 18, 2024

(87) PCT Pub. No.: WO2023/059142
PCT Pub. Date: Apr. 13, 2023

(65) Prior Publication Data
US 2024/0267594 A1 Aug. 8, 2024

(30) Foreign Application Priority Data
Oct. 7, 2021 (KR) .......................... 10-2021-0133354

(51) Int. Cl.
*H04N 21/472* (2011.01)
*G06F 3/0488* (2022.01)
(Continued)

(52) U.S. Cl.
CPC ..... *H04N 21/47217* (2013.01); *G06F 3/0488* (2013.01); *G06T 17/00* (2013.01); *H04N 21/43076* (2020.08); *H04N 21/4312* (2013.01)

(58) Field of Classification Search
None
See application file for complete search history.

(56) References Cited

U.S. PATENT DOCUMENTS 6,438,618 B1 * 8/2002 Lortz ..................... G06F 9/542
719/318
11,029,183 B2 * 6/2021 Rensing ................ G01F 1/8436
(Continued)

FOREIGN PATENT DOCUMENTS

KR 20160084991 A 7/2016
KR 20180049739 A 5/2018
(Continued)

OTHER PUBLICATIONS

YouTube Video. It's Good to Know. 'Occupational Safety and Health VR Education'. Angel's YouTube Channel from the Korea Occupational Safety and Health Agency. [Retrieved on Dec. 29, 2022]. Retrieved from <URL: https://youtu.be/cXQ3T-zefwU>.
(Continued)

*Primary Examiner* — Aaron M Richer
(74) *Attorney, Agent, or Firm* — NKL Law; Byungwoong Park

(57) ABSTRACT

The present disclosure relates to a VR video management method and system for enabling simultaneous training of multiple users. The present disclosure comprises steps in which: a manager terminal receives a plurality of VR videos from an operating server; the manager terminal is connected to a plurality of HMD terminals; the manager terminal plays back at least one of the plurality of VR videos received from the operating server; the VR video played back in the manager terminal is synchronized and played back in the plurality of HMD terminals; and the manager terminal generates a time control signal in the VR video according to a preset cycle.

1 Claim, 7 Drawing Sheets

(51) Int. Cl.
  *G06T 17/00*   (2006.01)
  *H04N 21/43*   (2011.01)
  *H04N 21/431*  (2011.01)

(56) References Cited

U.S. PATENT DOCUMENTS

2018/0352303 A1* 12/2018 Siddique ............. H04L 65/1069
2019/0286985 A1*  9/2019 Hirvijärvi ............. G08B 21/02
2021/0289255 A1*  9/2021 Balint .................. H04N 21/812
2023/0403424 A1* 12/2023 Bates ................. H04N 21/4122

FOREIGN PATENT DOCUMENTS

| KR | 20200012265 A | 2/2020 |
| KR | 20200056893 A | 5/2020 |
| KR | 102259350 B1  | 6/2021 |
| KR | 102404623 B1  | 6/2022 |

OTHER PUBLICATIONS

Office Action of KIPO for Korean application No. 10-2021-0133354, issued on Jan. 17, 2022.
Notice of Allowance of KIPO for Korean application No. 10-2021-0133354, issued on May 20, 2022.
WIPO, International Search Report for PCT/KR2022/015166, Jan. 9, 2023.

* cited by examiner

VR VIDEO MANAGEMENT METHOD AND SYSTEM FOR ENABLING SIMULTANEOUS TRAINING OF MULTIPLE USERS

TECHNICAL FIELD

The present disclosure relates to a VR video management method and system for enabling simultaneous training of multiple users, and particularly to, a VR video management method and system for enabling simultaneous training of multiple users enabling training through a VR video on a site and managing and controlling the VR video in real time using only a plurality of HMD terminals synchronized with a manager terminal.

BACKGROUND ART

Recently, the demand for safety training using VR videos has been increasing at construction sites. In most training using VR videos, it is general that trainees wear HMD terminals and move around and experience firsthand training equipment similar to actual equipment installed in a specific place. However, such experiential VR training has issues such as the installation cost of the training equipment being expensive, a specific place being required, and movement of the training equipment being difficult. In addition, this experiential VR training takes a long time because only people wearing HMD terminals may sequentially be trained.

To address these issues, there is a request for a service that allows realistic on-site training only by watching VR videos without installing separate training equipment.

The related art patent, Korean Patent Application Publication No. 10-2018-0049739 (HMD mobile terminal and operating method thereof), merely discloses a technology in which HMD terminals are synchronized to control videos and one user controls a video of another user.

SUMMARY

Technical Problems

An aspect of the present disclosure is directed to providing a VR video management method and system for enabling simultaneous training of multiple users enabling training through a VR video on a site and managing and controlling the VR video in real time using only a plurality of HMD terminals synchronized with a manager terminal.

Technical Solution

A VR video management method for enabling simultaneous training of multiple users of an embodiment of the present disclosure includes: receiving, by a manager terminal, a plurality of VR videos from an operating server; connecting the manager terminal to a plurality of HMD terminals; playing back, by the manager terminal, at least one of the plurality of VR videos received from the operating server; synchronizing and playing back, in the plurality of HMD terminals, the VR video played back in the manager terminal; and generating, by the manager terminal, a time control signal in the VR video according to a preset cycle.

A VR video management system for enabling simultaneous training of multiple users of an embodiment of the present disclosure includes: an operating server that stores a plurality of VR videos and provides the same to a manager terminal; the manager terminal that receives the plurality of VR videos from the operating server and plays back at least one of the plurality of VR videos received from the operating server; and a plurality of HMD terminals that are synchronized with the manager terminal and play back a VR video played back in the manager terminal, wherein, when the manager terminal generates a time control signal in the VR video according to a preset cycle and simultaneously transmits the generated time control signal to the plurality of HMD terminals, simultaneous control for multiple users is possible, with the plurality of HMD terminals adjusting a VR video time according to the received time control signal.

Effect of Invention

According to an embodiment of the present disclosure, there is no need to install separate equipment when training using VR videos, and simultaneous experiential training is possible for many trainees at once. In other words, training is possible anywhere, regardless of place, using only a manager terminal and HMD terminal without the need to prepare a space for the experience.

In addition, VR video control, gaze guidance, status display, time control, and VR video management are possible using only the manager terminal, making VR video training easy on a site.

In addition, highly immersive VR video training is possible by periodically controlling a time on a plurality of HMD terminals synchronized with the manager terminal.

DETAILED DESCRIPTION OF EXEMPLARY EMBODIMENTS

Figure 1:
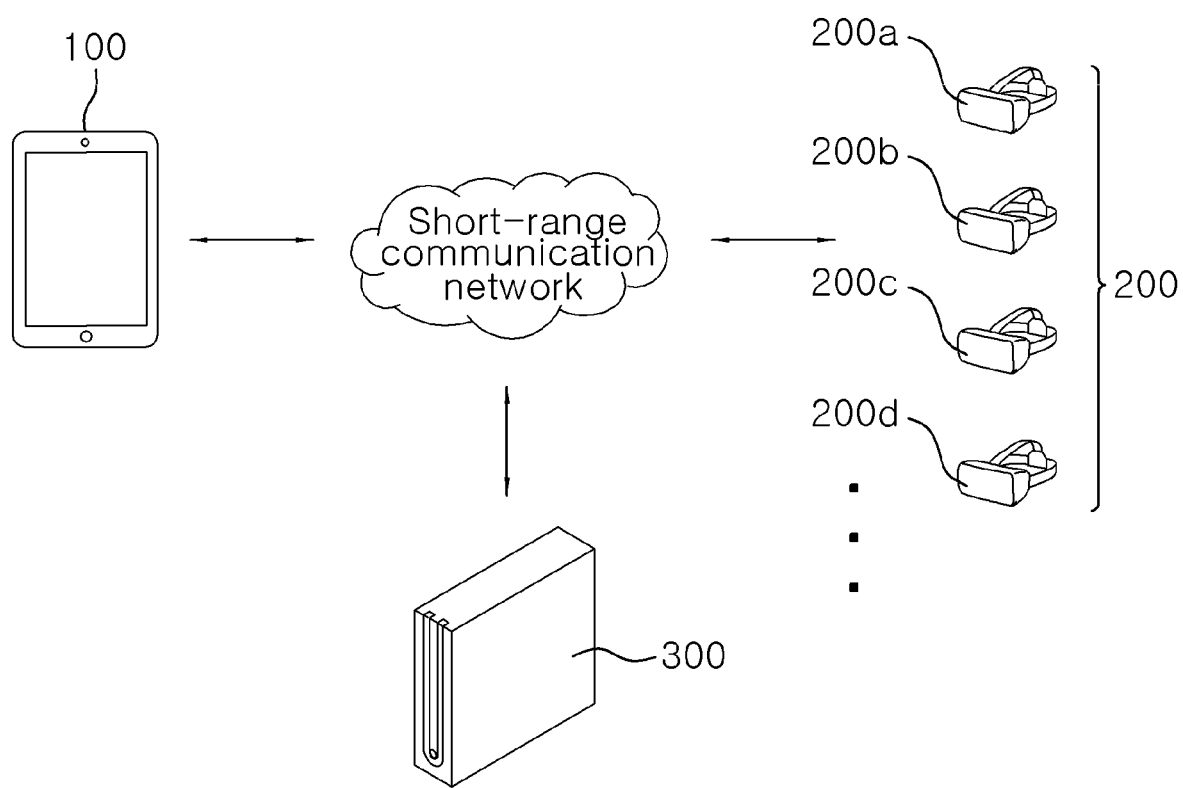
FIG. 1 is a conceptual diagram illustrating a VR video management system for enabling simultaneous training of multiple users according to an embodiment of the present disclosure.

As specific structural or functional descriptions for the embodiments according to the concept of the present disclosure disclosed herein are merely exemplified for purposes of describing the embodiments according to the concept of the present disclosure, the embodiments according to the concept of the present disclosure may be embodied in various forms and are not limited to the embodiments described herein.

While the embodiments of the present disclosure are susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure.

The terms used herein are presented for the description of the specific embodiments but are not intended to limit the present disclosure. The terms in singular form may include plural forms unless otherwise specified. It will be understood that the terms "comprising" or "having," when used herein, specify the presence of stated features, integers, steps, operations, elements, components, or combinations thereof, but do not preclude the presence or addition of one or more other features, integers, steps, operations, elements, components, and/or combinations thereof.

Hereinafter, embodiments of the present disclosure will be described in detail with reference to the accompanying drawings.

FIG. 1 is a conceptual diagram illustrating a VR video management system for enabling simultaneous training of multiple users according to an embodiment of the present disclosure.

Referring to FIG. 1, a VR video management system 10 for enabling simultaneous training of multiple users is configured of a manager terminal 100, a plurality of HMD terminals 200 (200a to 200d), and an operating server 300. The operating server 300 may produce and store a plurality of VR videos and provide the plurality of stored VR videos to the manager terminal. In this connection, the plurality of VR videos may be organized in the order of possible accident scenes at a construction site, causes of disasters, and preventive measures. For example, when the subject of the plurality of VR videos is related to human disasters, the video may be about workplace organization, handling of heavy materials, material management, unsafe work, carelessness, portable ladder, circular saw, fire and explosion, hand grinder, lift, confined space, fall, and insufficient work methods. When the subject of the plurality of VR videos is related to heavy equipment disasters, the video may be about worker access restrictions within the work radius, soil collapse, unloading of rocks and soil, overloading of cargo and occurrence of unbalanced load, lack of driver visibility, collision with excavator and materials, collision with dump truck, collision, hydraulic system abnormalities, cargo box maintenance, maloperations and malfunctions, and wire rope and sling bet breakage. The operating server 300 may use a VR rig to film specialized for VR and perform three-dimensional effects and elaborate stitching to produce and store more realistic VR training videos. The manager terminal 100 may receive the plurality of VR videos from the operating server 300, play back one VR video selected among the plurality of VR videos received from the operating server, and control the HMD terminal 200 synchronized with the manager terminal to play back the VR video played back in the manager terminal simultaneously. Accordingly, an embedment of the present disclosure is provided only with the manager terminal and the plurality of HMD terminals when training using a VR video, enabling simultaneous experiential training for many trainees at once. In addition, training is possible anywhere, regardless of place, using only the manager terminal and HMD terminal without the need to prepare a space for the experience.

Figure 2:
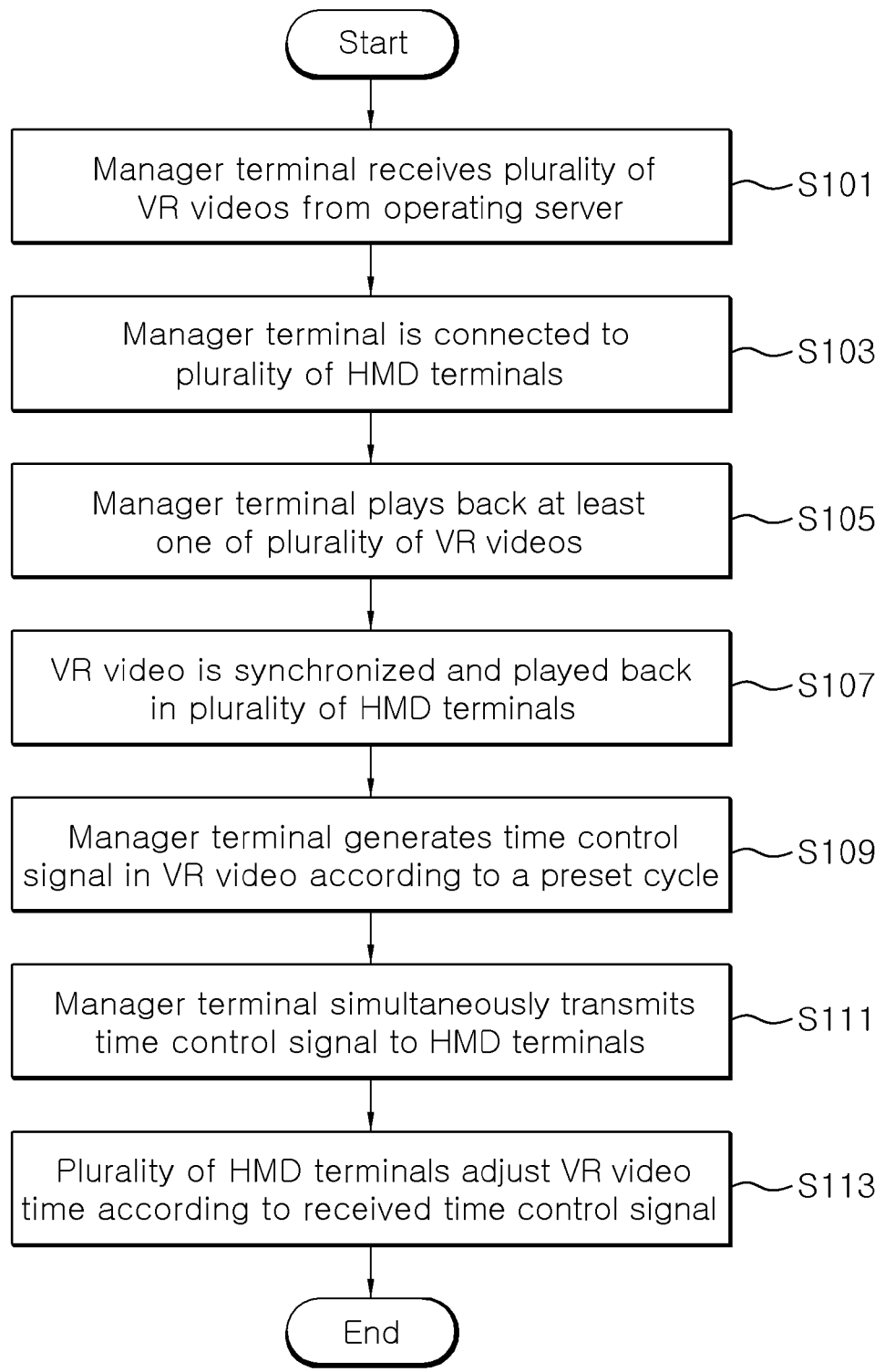
FIGS. 2 and 3 are flowcharts illustrating a VR video management method for enabling simultaneous training of multiple users according to an embodiment of the present disclosure.
Figure 3:
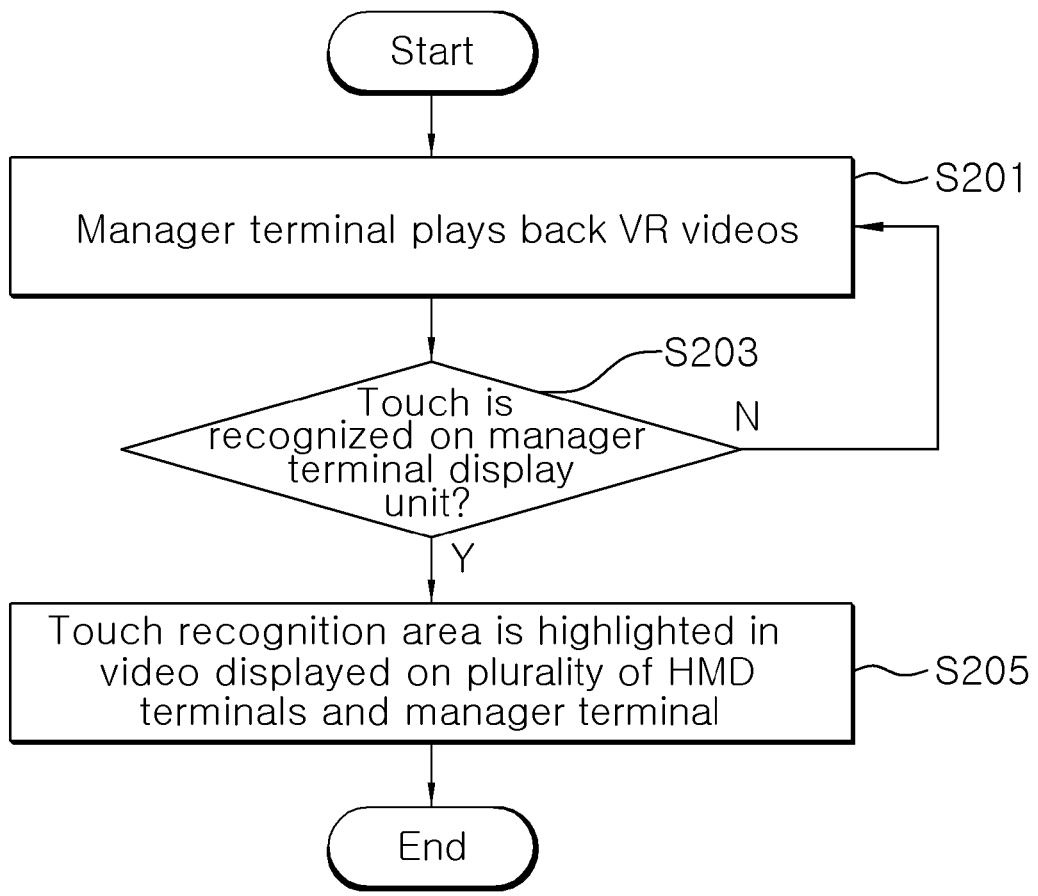

FIGS. 2 and 3 are flowcharts illustrating a VR video management method for enabling simultaneous training of multiple users according to an embodiment of the present disclosure.

Referring to FIG. 2, a VR video management method for enabling simultaneous training of multiple users is configured to receive, by the manager terminal, a plurality of VR videos received from the operating server (S101). The manager terminal is connected to the plurality of HMD terminals (S103).

The manager terminal plays back at least one of the plurality of VR videos received from the operating server (S105). A manager conducting training may select and playback one of the plurality of VR videos through the manager terminal, and the played back VR video may be played back, paused, and terminated in batches in each of the HMD terminals. Additionally, the manager terminal may check the remaining battery capacity and connection status of each of the plurality of connected HMD terminals. The manager terminal may set categories such as construction, service, and manufacturing, and may list up and selectively play back videos corresponding to the classified categories.

The VR video played back in the manager terminal is synchronized and played back in the plurality of HMD terminals (S107). The manager terminal may playback or stop, and control the screens of all synchronized HMD terminals.

The manager terminal generates a time control signal in the VR video according to a preset cycle (S109). The manager terminal simultaneously transmits the generated time control signal to the plurality of HMD terminals (S111). The plurality of HMD terminals adjust a VR video time according to the received time control signal (S113). Through the generated time control signal, the time of the HMD terminals is readjusted and the center of the video is reset, enabling more immersive VR video training. By periodically controlling the time, when the plurality of HMD terminals play back VR videos simultaneously, it is possible to prevent the VR videos from being played back improperly due to incorrect times when the HMD terminals are terminated.

Referring to FIG. 3, the manager terminal plays back at least one of the VR videos received from the operating server (S201). When a touch is recognized on a display unit of the manager terminal (S203), coordinates of an area where the touch of the manager terminal is recognized are transmitted to the plurality of HMD terminals, and the touch recognition area corresponding to the received coordinates is highlighted in a video displayed on the plurality of HMD terminals (S205). In other words, it is possible to conduct focused and effective training by displaying a pointer or text in real time on the manager terminal during training.

Figure 4:
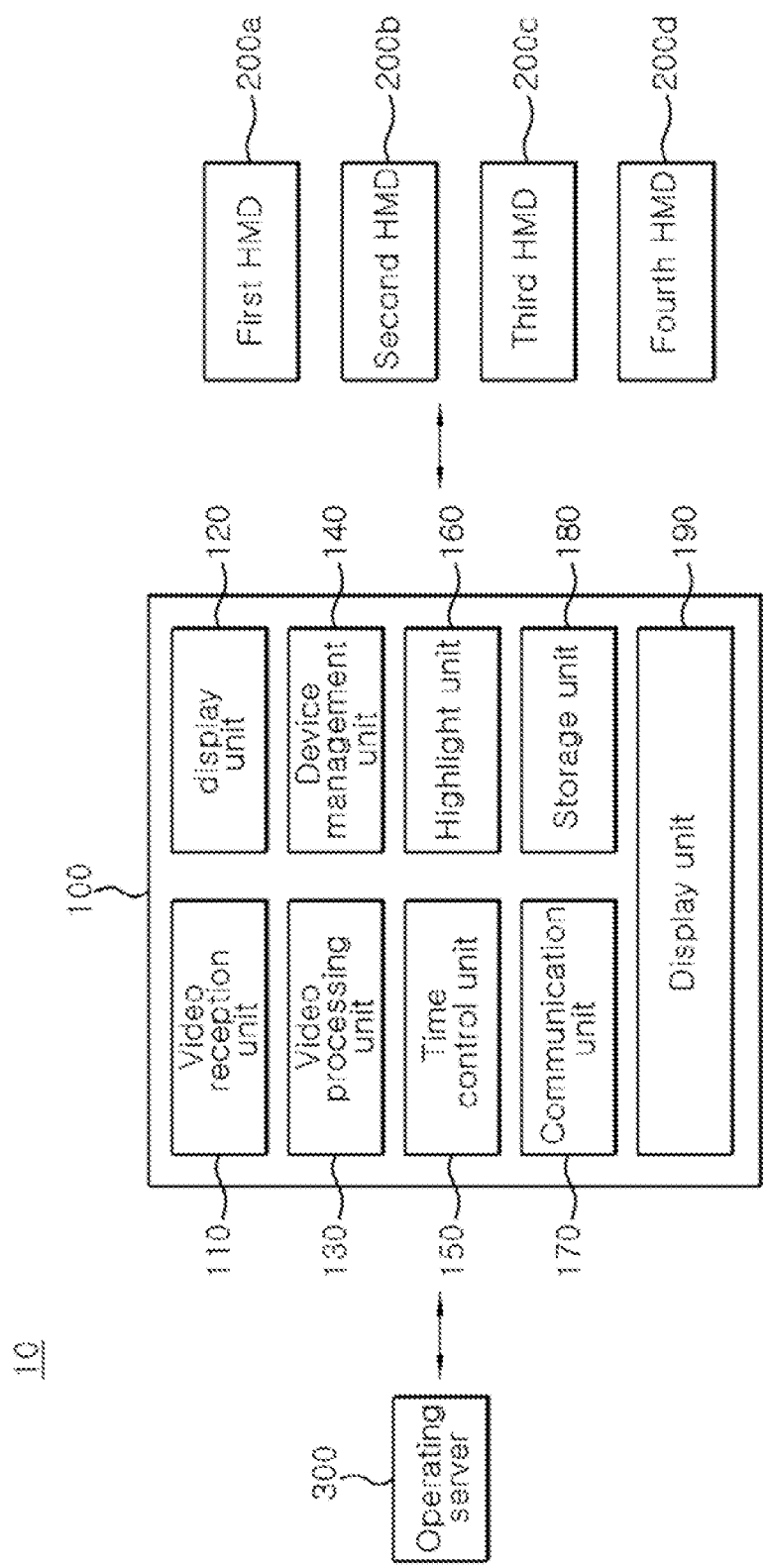
FIG. 4 is a configuration diagram illustrating a VR video management system for enabling simultaneous training of multiple users according to an embodiment of the present disclosure.

FIG. 4 is a configuration diagram illustrating a VR video management system for enabling simultaneous training of multiple users according to an embodiment of the present disclosure.

Referring to FIG. 4, the VR video management system 10 is configured of the manager terminal 100, the plurality of HMD terminals 200, and the operating server 300.

The manager terminal 100 may receive the plurality of VR videos from the operating server 300, and select and play back at least one of the plurality of VR videos received from the operating server. The plurality of HMD terminals 200 may be synchronized with the manager terminal and play back VR videos played back in the manager terminal.

The manager terminal 100 is configured of a video reception unit 110, the display unit 120, a video processing unit 130, a device management unit 140, a time control unit 150, a highlight unit 160, a communication unit 170, a storage unit 180, and a control unit 190.

The video reception unit 110 may receive the plurality of VR videos from the operating server 300. The video reception unit 110 may classify the plurality of VR videos into categories and store the same in the storage unit.

The display unit 120 may display and play back the selected VR video, and may play back, pause, and terminate the VR video under the control of the control unit. In addition, it is possible to provide a list according to the category of VR videos, and to control at least one of the connection status, remaining battery capacity, power, audio volume, and time readjustment of the plurality of HMD terminals.

The video processing unit 130 may preprocess a plurality of VR videos received from the operating server 300 to enable simultaneous playback on the plurality of HMD terminals. Additionally, when a VR video update is received from the operating server 300, the update may be performed.

The device management unit 140 is connected to the plurality of HMD terminals through a short-range communication network, and may check the status of the connected HMD terminals when the remaining battery capacity, power, audio volume, and time readjustment of the HMD terminals are selected.

The time control unit 150 generates a time control signal in the VR video according to a preset cycle and simultaneously transmits the generated time control signal to the plurality of HMD terminals to adjust the time of the VR video.

When a touch is recognized in a specific area of a display unit of the manager terminal, the highlight unit 160 may transmit the coordinates of the area where the touch has been recognized to the plurality of HMD terminals. The touch recognition area corresponding to the coordinates received from the videos displayed on the plurality of HMD terminals is highlighted. In other words, it is possible to conduct focused and effective training by displaying a pointer or text in real time on the manager terminal during training. In other words, two-way communication between trainees and trainers may be possible when watching VR videos.

The communication unit 170 may transmit and receive data with the operating server and the plurality of HMD terminals through a short-range communication module. The storage unit 180 may store received VR videos and data generated by each configuration.

The control unit 190 may control the manager terminal using operating software to control each configuration of the manager terminal. The control unit may control simultaneous playback of 100 or more Wi-Fi-based HMD terminals with a delay of less than 1 second, and may control VR videos such as playback and pause of the video, as well as section jumps.

Figure 5:
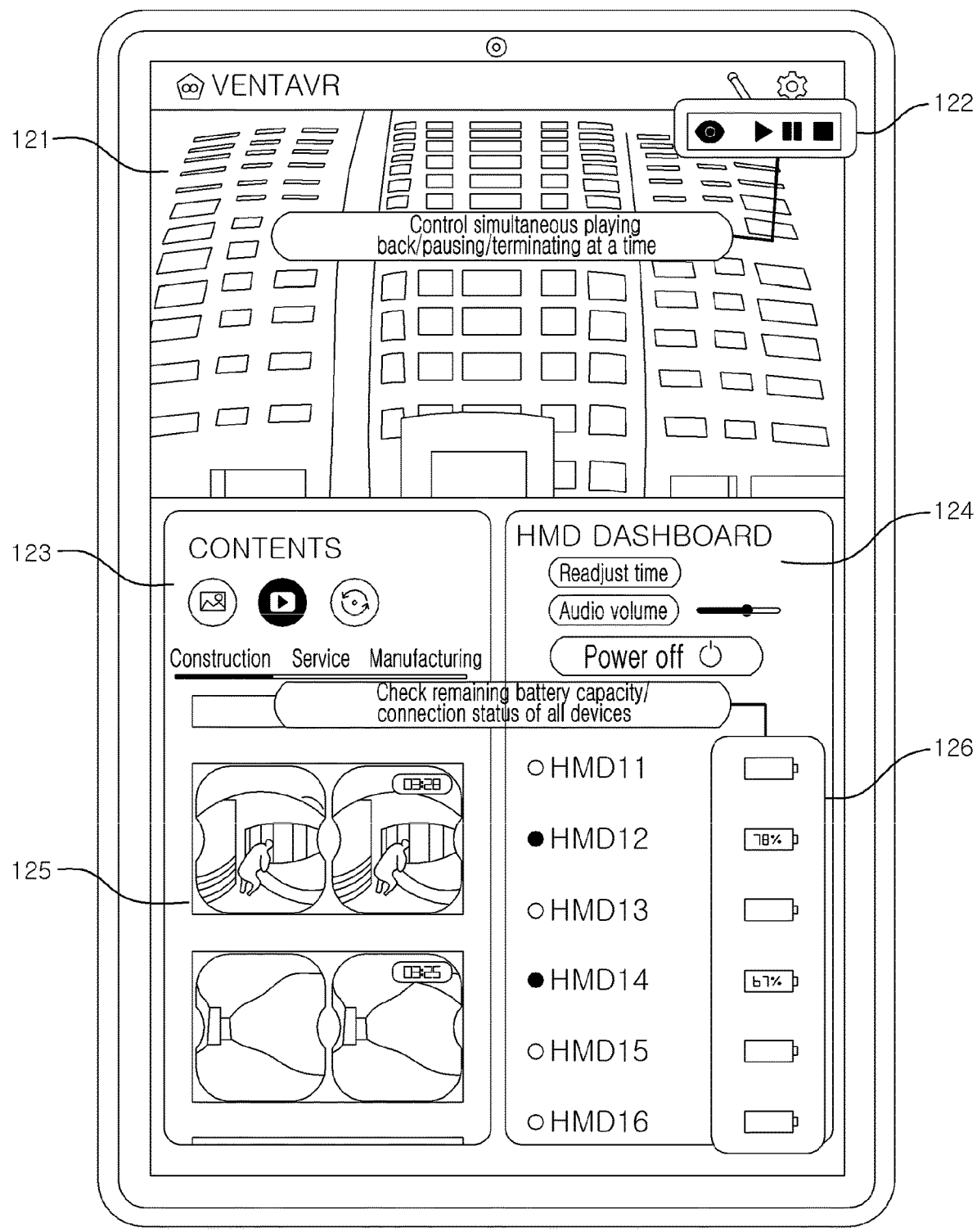
FIGS. 5 to 7 are exemplary diagrams of a VR video management method for enabling simultaneous training of multiple users according to an embodiment of the present disclosure.
Figure 6:
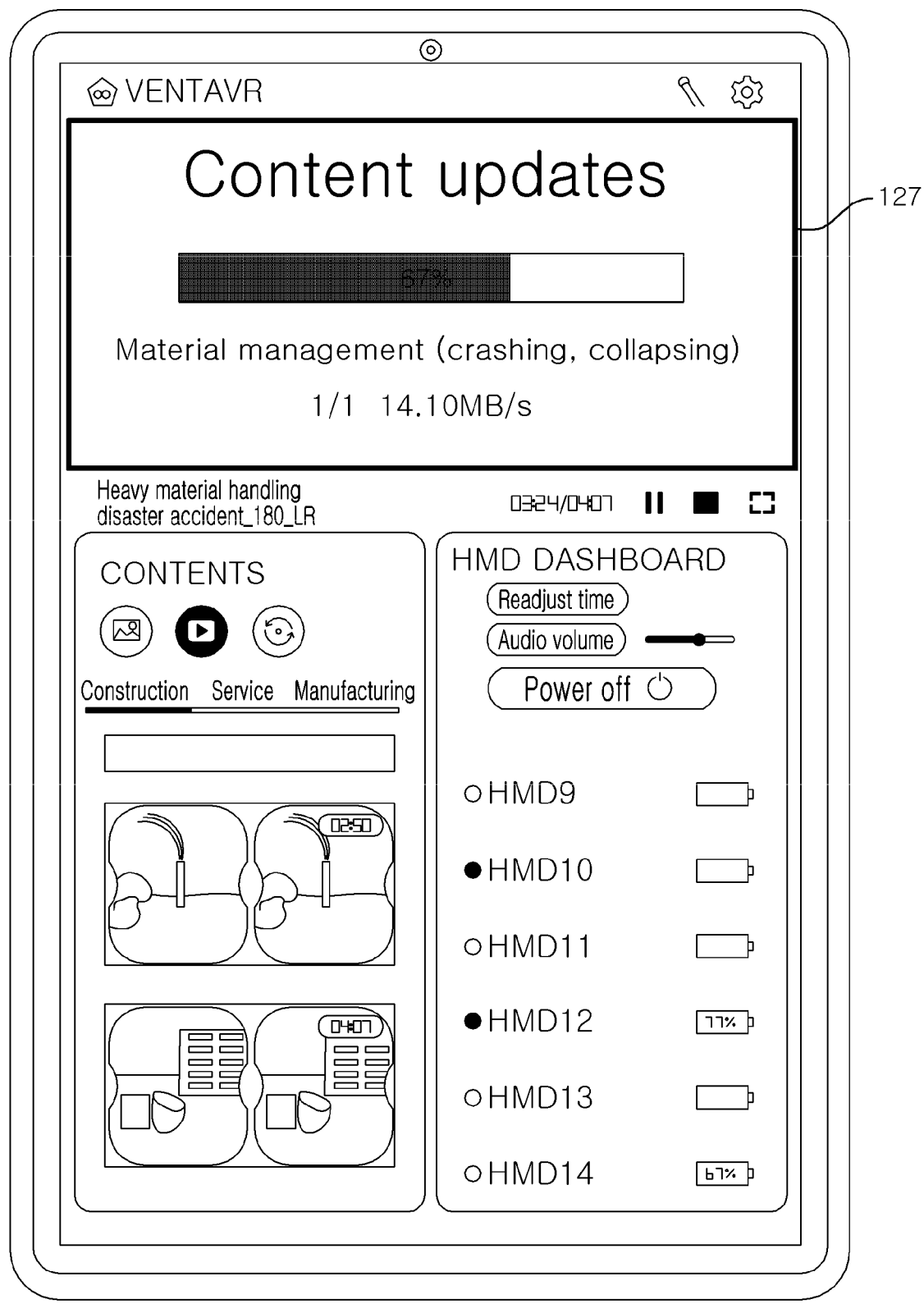
Figure 7:
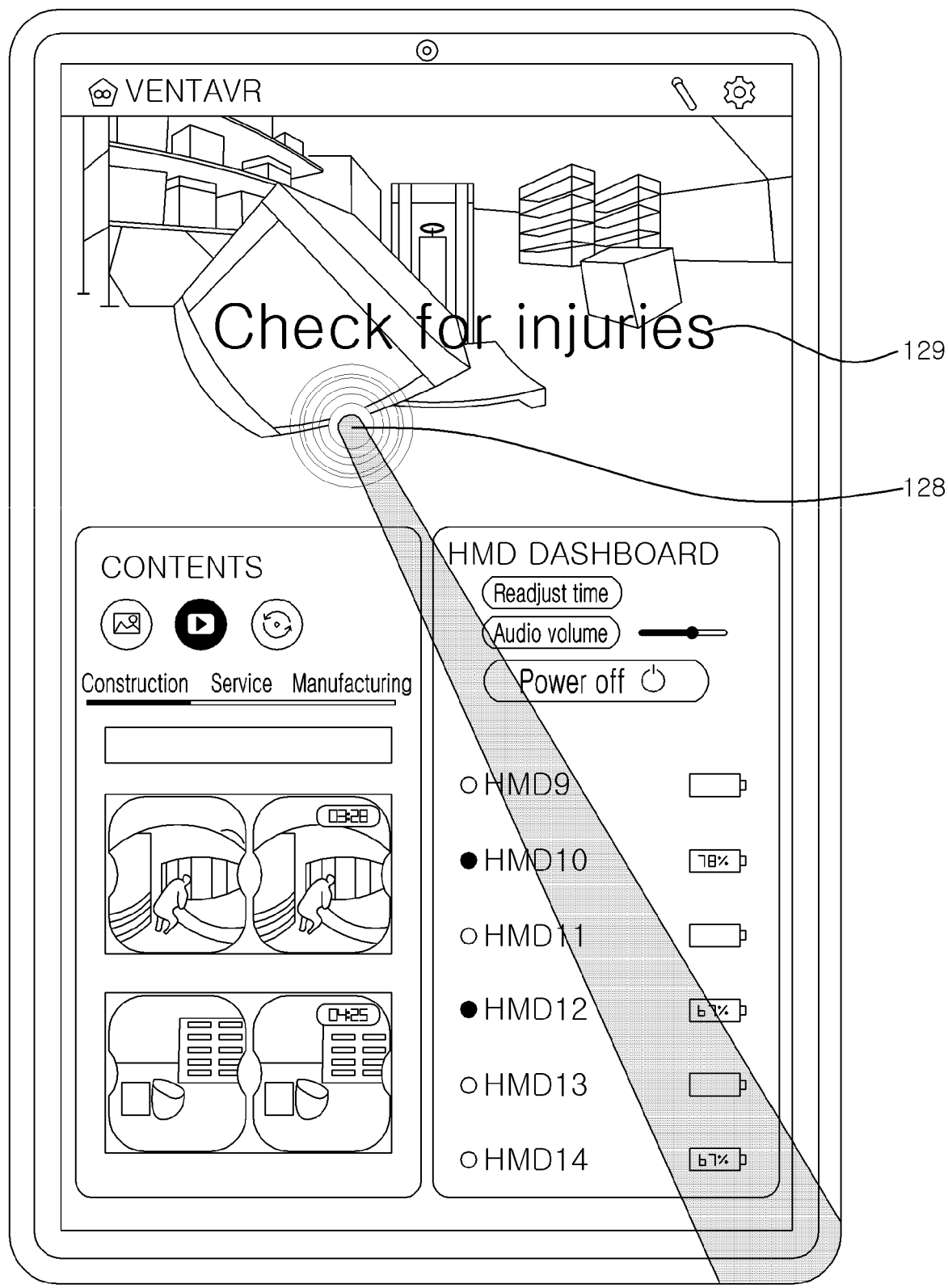

FIGS. 5 to 7 are exemplary diagrams of a VR video management method for enabling simultaneous training of multiple users according to an embodiment of the present disclosure. Referring to FIG. 5, on the display unit of the manager terminal, the selected VR video 121 is illustrated at an upper end, and an icon 122 for controlling the VR video is illustrated at a right upper end. At a left lower end of the VR video 121, categories 123 such as images, videos, construction videos, service videos, and manufacturing videos may be selected. At a lower end, the plurality of VR videos for each category are illustrated so as to be illustrated so that managers may make intuitive choices. A right lower end of the VR video illustrates an HMD DASHBOARD 124, which allows checking of the remaining battery capacity 126 and connection status of the plurality of HMD terminals, as well as turn off power, readjust a time, and control an audio volume.

Referring to FIG. 6, when a VR video update is received from the operating server, the video processing unit may update the video 127. Referring to FIG. 7, when a touch is recognized in a specific area of the manager terminal, the highlight unit may display a pointer 128 or text 129 in real time and display the same on the plurality of HMD terminals simultaneously.

While the present disclosure has been described in connection with the exemplary embodiments illustrated in the drawings, they are merely illustrative and the present disclosure is not limited to these embodiments. It will be appreciated by a person having an ordinary skill in the art that various equivalent modifications and variations of the embodiments can be made without departing from the spirit and scope of the present disclosure. Therefore, the true technical scope of the present disclosure should be defined by the technical spirit of the appended claims.

The invention claimed is:

1. A VR video management method for enabling simultaneous training of multiple users, the method comprising:
    receiving, by a manager terminal, a plurality of VR videos from an operating server;
    connecting the manager terminal to a plurality of HMD terminals;
    playing back, by the manager terminal, at least one of the plurality of VR videos received from the operating server;
    synchronizing and playing back, in the plurality of HMD terminals, the at least one of the plurality of VR videos played back in the manager terminal;
    generating, by the manager terminal, a time control signal in the at least one of the plurality of VR videos according to a preset cycle;
    simultaneously transmitting, by the manager terminal, the generated time control signal to the plurality of HMD terminals; and
    adjusting, by the plurality of HMD terminals, a VR video time according to a received time control signal,
    wherein:
    when a touch is recognized on a display unit of the manager terminal, coordinates of an area where the touch of the manager terminal is recognized are transmitted to the plurality of HMD terminals; and the touch recognition area corresponding to a received coordinates is highlighted in a video displayed on the plurality of HMD terminals;
    the plurality of VR videos are organized in the order of possible accident scenes at a construction site, causes of disasters, and preventive measures;
    the manager terminal selects and plays back one of the plurality of VR videos; the at least one of the plurality of VR videos is played back, paused, and terminated in batches in each of the HMD terminals; and the manager terminal checks the remaining battery capacity and connection status of each of the plurality of HMD terminals, sets categories including construction, service, and manufacturing, and lists up and selectively plays back videos corresponding to a classified categories; and
    on the display unit of the manager terminal, the at least one of the plurality of VR videos is illustrated at an upper end; an icon for controlling the at least one of the plurality of VR videos is illustrated at a right upper end; at a left lower end of the VR video, categories including images, videos, construction videos, service videos, and manufacturing videos are selected; at a lower end, the plurality of VR videos for each category are illustrated; and a right lower end of the at least one of the plurality of VR videos illustrates an HMD DASHBOARD, which allows checking of the remaining battery capacity and connection status of the plurality of HMD terminals, as well as turning off power, readjusting a time, and controlling an audio volume.

\* \* \* \* \*